United States Patent [19]
Williams

[11] 3,726,505
[45] Apr. 10, 1973

[54] BUTTERFLY VALVE WITH SHIM SEAT ADJUSTMENT

[75] Inventor: Hubert L. Williams, Hinsdale, Ill.

[73] Assignee: Clow Corporation, Oak Brook, Ill.

[22] Filed: Nov. 15, 1971

[21] Appl. No.: 198,718

[52] U.S. Cl...................................251/307, 277/188
[51] Int. Cl..........................F16k 1/226, F15j 15/16
[58] Field of Search......................251/170, 171, 172, 251/173, 306, 307; 277/188

[56] References Cited

UNITED STATES PATENTS 3,630,485   12/1971   Williams...............................251/307

Primary Examiner—Henry T. Klinksiek
Attorney—Fitch, Even, Tabin & Luedeka

[57] ABSTRACT

A butterfly valve is provided which includes a resilient ring defining a valve disc seat and chocks and shims arranged so as to compress the ring and expand it radially.

10 Claims, 5 Drawing Figures

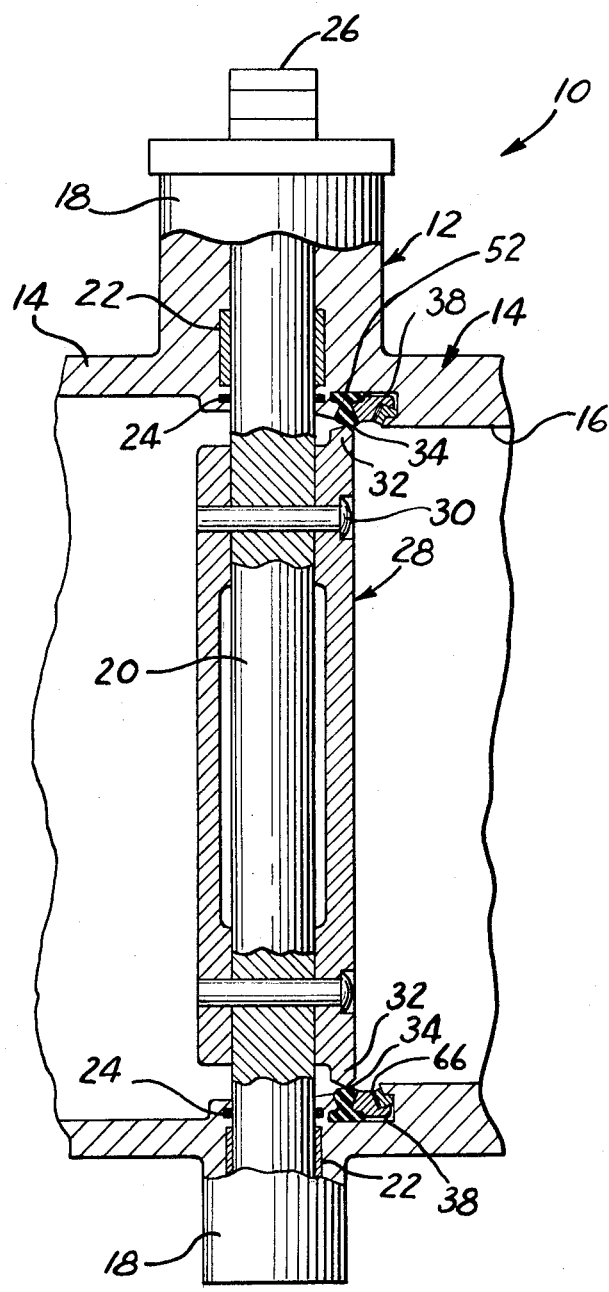

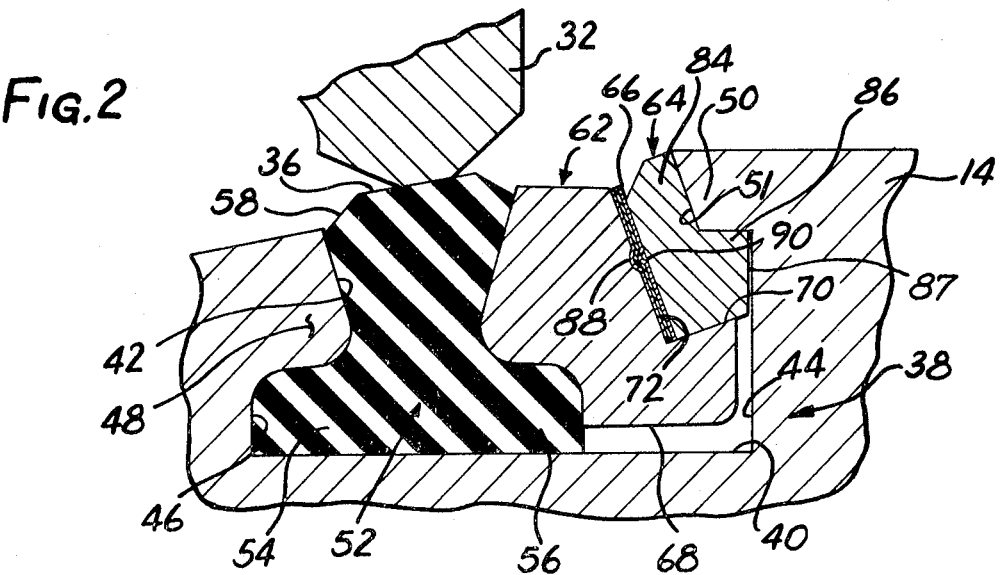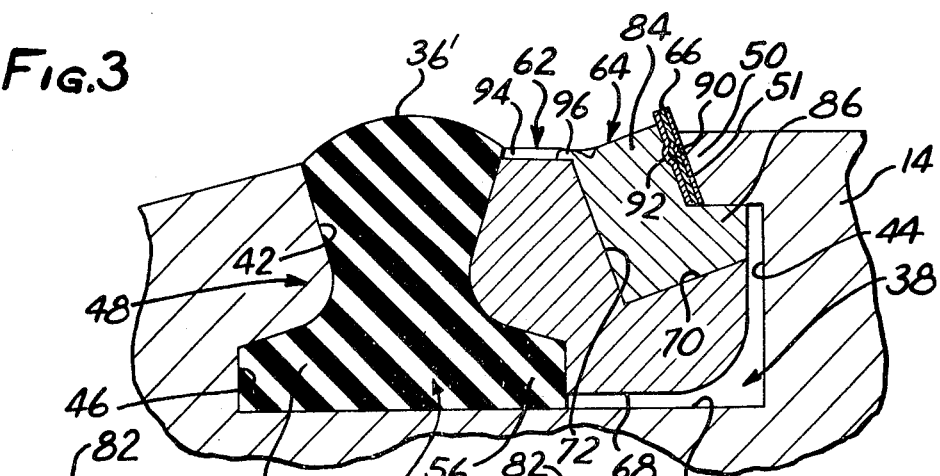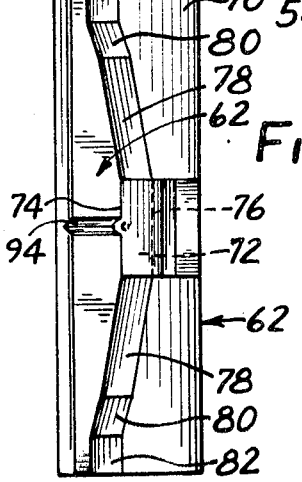

BUTTERFLY VALVE WITH SHIM SEAT ADJUSTMENT

The present invention relates to butterfly valves and, more particularly, to butterfly valves which include a resilient valve seat adapted to cooperate with the periphery of the valve disc to provide a seal.

Butterfly valves conventionally include a valve body defining a fluid flow passageway, and a circular or generally circular valve disc mounted within the valve body for pivotal movement between an open position parallel to the longitudinal axis of the flow passageway and a closed position generally perpendicular to the longitudinal axis of the flow passageway. When in the closed position, a peripheral portion of the disc engages a seat defined by the valve body to provide a fluid-tight seal. One of the interengaging sealing surfaces is preferably defined by a resilient material to assure a tight fit between these surfaces. In addition, the position of one of the surfaces is desirably rendered adjustable to eliminate the necessity of precise machining when the valve is fabricated and to permit compensation for wear and other factors adverse to a fluid-tight seal after the valve has been placed in service.

One approach for achieving the desired surface adjustment is to provide means for placing the resilient material defining one of the interengaging sealing surfaces in compression so as to expand the material and thereby shift the position of that sealing surface. The present invention relates to such a means particularly adapted to placing in compression and expanding a resilient material which defines that sealing surface which is supported by the valve body and is engageable by the valve disc.

Accordingly, it is the principal object of the present invention to provide an improved butterfly valve of the type which includes a valve disc seat defined by a resilient material and means for placing the resilient material in compression so as to shift the position of the valve seat.

Other objects and advantages of the invention will become apparent with reference to the following description and the accompanying drawings.

In the drawings:

FIG. 1 is a fragmentary elevational view, partially in section, of a butterfly valve showing various of the features of the invention;

FIG. 2 is an enlarged fragmentary sectional elevational view of a portion of the butterfly valve shown in FIG. 1;

FIG. 3 is an enlarged fragmentary plan view similar to that of FIG. 2 but showing an alternate embodiment of the invention;

FIG. 4 is a plan view of a portion of the butterfly valve construction shown in FIG. 3; and FIG. 5 is a fragmentary plan view showing another embodiment of the invention.

Referring more specifically to the drawings, there is illustrated in FIG. 1 a butterfly valve 10 which incorporates various of the features of the invention. The valve 10 includes a valve body 12, only a portion of which is illustrated. Basically, the valve body includes a generally cylindrical wall 14 defining a fluid flow passageway 16, the longitudinal axis of this passageway being hereinafter referred to as the flow axis of the passageway. Although not shown in the drawing, it is contemplated that means be provided at each end of the cylindrical wall 14 to facilitate attachment of the valve body to suitable segments of pipe or conduit.

Projecting from the valve body at diametrically opposed locations are a pair of trunnions 18 which define suitable journals for a valve stem 20. Although all of the internal details of construction of the trunnions are not shown, each journal is illustrated as being lined with a suitable bearing material indicated at 22, and each may be provided with a sealing element such as an O-ring 24 disposed in a suitable groove, as shown, or in the bearing space. One end 26 of the valve stem 20 projects outwardly of its trunnion 18 for connection to a suitable operating device (not shown) by means of which rotation of the stem is effected.

A valve disc 28 is mounted on the valve stem and, as illustrated, is cylindrical and includes a diametrical bore to receive the valve stem 20. However, the disc may be provided with diametrically opposed flats under some circumstances at the points where the valve stem is joined to the disc. Suitable holes extend through the disc and stem to receive pins 30 by means of which the disc is secured to the stem, but the disc may also be keyed or otherwise held to the stem. The disc includes adjacent one face a radially projecting peripheral flange 32 machined to provide an edge 34 which is the only portion of the disc to engage the valve seat 36 (FIGS. 2 and 3), soon to be described. The plane within which the edge 34 of the valve disc lies is offset from the axis of rotation of the disc, as defined by the longitudinal axis of the valve stem 20, to make possible 360° contact between the edge 34 and the valve seat 36.

In order to accommodate the means defining the valve seat 36, the valve body 12 is provided with an inner annular groove 38 in the surface of the cylindrical wall 14 which defines the fluid flow passageway 16. The groove is positioned so as to be intersected by the plane defined by the valve disc edge 34 when the disc is in the closed position transverse to the fluid flow passageway and includes a base 40 and opposed side walls 42 and 44 (FIGS. 2 and 3). The base 40 may define a generally cylindrical surface, and is so illustrated, while the side walls 42 and 44 are contoured (FIGS. 2 and 3). More specifically, the groove wall 42 nearest the valve stem 20, hereinafter sometimes referred to as the left wall because of its location in the drawings, is undercut to provide a slot 46 relative to which an upper portion 48 is disposed in overhanging relation. The face of the upper portion 48 is slightly inclined relative to the flow axis of the passageway 16. The opposite or right wall 44 of the groove is provided with a projection 50 adjacent its upper edge which overhangs the groove base 40, and the face 51 of the projection is also inclined relative to the flow axis of the passageway toward the base 40 and may be roughly parallel to the inclined face of the upper portion 48 of the opposite groove wall 42. The face 51 of the projection 50 defines a bearing surface, the function of which will become apparent shortly.

The valve seat 36 is defined by the radially inner surface of a ring 52 formed of a resilient elastomeric material such as rubber which will expand under compression if otherwise unrestrained. Various materials known in the art for this particular application are suitable. The ring 52 may be formed of one piece or two or more pieces, which pieces may or may not be connected or bonded to one another at their adjacent ends. It is formed to provide a pair of axially extending flanges 54 and 56 adjacent its outer periphery (FIGS. 2 and 3), and extends radially from these flanges a distance greater than the depth of the groove 38 so that the seat 36, defined by the inner surface of the ring 52, is disposed inwardly of the inner surface of the valve body walls defining the fluid flow passageway 16. As shown, the ring is of a lesser axial width than the groove 38, i.e., the axial width of the ring at its outer surface defined by the flanges 54 and 56 is less than the axial width of the base 40 of the groove. However, the flanges 54 and 56 could extend from the wall 44 to the wall 46 of the groove if desired. The seat 36 itself may define a cylindrical surface but, as shown in FIG. 2, is inclined slightly relative to the flow axis and therefore defines a conical surface to enhance the sealing ability of the valve. In the embodiment of FIG. 3, the seat 36' is curved and defines a convex surface to accomplish the same function. The leading and trailing edges of the ring shown in FIG. 2 are chamferred adjacent the seat 36, as at 58.

As disposed in the groove 38, the outer surface of the ring 52 rests on the base 40 of the groove, with the flange 54 of the ring disposed within the slot 46 of the groove wall 42, thereby serving to partially lock the ring within the groove. Preferably, the groove wall 42 and the adjacent surface of the ring 52 are so shaped as to permit intimate engagement between the wall and ring. In the embodiment illustrated in FIG. 2, the edges of the groove wall and the flange 54 of the ring are each rounded to eliminate stress concentrations. Because of the difference between the axial width of the ring and the axial width of the groove, an annular space is provided between the opposite surface of the ring (i.e., the surface on the right in FIGS. 2 and 3) and the wall 44 of the groove.

With the ring supported on the base 40 of the groove with one face thereof in abutting intimate engagement with the wall 48 of the groove, compressive forces applied to the opposite face of the ring, particularly those having an axial component, will cause radial inward expansion of the ring effective to vary the position of the sealing surface 36. Such compressive forces are maintained on the ring by adjustable means, hereinafter described.

The adjustable means include a plurality of arcuate segments 62 adapted to be disposed in the annular space between the valve seat ring 52 and the wall 44 of the groove 40 in end-to-end relation and to be urged into pressure engagement with the valve seat ring 52. A plurality of chocks 64 and shims 66 are also provided and are adapted to maintain the segments in such pressure engagement.

More specifically, each segment 62 is in the form of an elongated bar bowed slightly to render it arcuate when properly disposed in the groove 38 and viewed in a plane normal to the flow axis of the passageway 16. The segments are preferably relatively short in length. For example, with segments approximately 4 inches in length, 12 segments are provided for a valve having a flow passageway diameter of 16 inches. Each segment has one longitudinally extending wall contoured so as to enable it to intimately engage the adjacent face, i.e., the right hand face, of the valve seat ring 52. Each segment is dimensioned so that when it is in intimate engagement with the ring, its lower surface 68 is elevated slightly above the base 40 of the groove 38. Thus, the segments 62 are readily movable axially within the annular space defined by the ring 52 and the groove wall 44.

The remaining longitudinally extending wall of each of the segments 62, i.e., the wall not in contact with the valve seat ring 52 (FIGS. 2 and 3), is provided with a ledge 70 which slopes downwardly and to the left as viewed in FIGS. 2 and 3, and with a face which extends from the left edge of the ledge 70 to the left and in the direction of the flow axis of the valve body. The central portion 72 of this face is disposed generally parallel to the bearing surface 51 of the projection 50 and is bordered by upper and lower edges 74 and 76, respectively (FIG. 4), which lie in parallel planes normal to the flow axis of the fluid flow passageway 16. On each side of the central portion 72 in the embodiment of FIG. 4 are a pair of flanking surfaces 78 which diverge away from the bearing face 51 of the projection. Adjacent each flanking surface 78 in such embodiment is a second flanking surface 80 which is also inclined relative to the bearing surface 51 and which diverges at an even greater angle from that surface. Adjacent each flanking surface 80 and located at each end of the segment is an end surface 82 which is generally parallel to the bearing surface 51. This configuration of the segments 62 facilitates positioning of the chocks 64 and shims 66, as will become apparent shortly.

In the embodiment of FIG. 5, the central portion 72 is of greater length, extending nearly to the end surfaces 82 and connected thereto by an only slightly inclined surface 80. In both embodiments, the surfaces 72 and 82 are parallel to one another, with the surface 72 in closer proximity to the bearing surface 51. In the embodiment of FIG. 5, ribs 83 are provided on the surface 72 in spaced relation to each end surface 82 to facilitate positioning of two chocks 64 and shims 66, relative to the surface 72.

A single chock 64 in the embodiment of FIG. 4, or two chocks in the embodiment of FIG. 5, and one or more shims 66 for each chock are together inserted intermediate each segment 62 and an adjacent portion of the bearing surface 51 of the projection 50. This may be done by locating the chock 64 in engagement with the bearing surface 51 of the projection 50 and placing one or more shims 66 intermediate the chock and segment, as in FIGS. 1 and 2, or may be done by placing the chock 64 in engagement with the segment and placing one or more shims 66 intermediate the chock and the bearing surface 51 as in FIGS. 3 and 4.

In either case, at least one chock 64 is provided for each segment 62 and is adapted to be disposed adjacent the central portion 72 of the segment, i.e., centrally of the segment in the embodiment of FIG. 4 or adjacent each end of the central portion in the embodiment of FIG. 5. Each chock is generally of L-shaped cross section as viewed in a plane containing the axis of the flow passageway 16 and includes a first leg 84 having opposed parallel surfaces and a second leg 86 having converging faces. The outer surfaces of the chock, i.e., the surfaces adjacent the ledge 70 and central portion 72 of the segment, are at the same angle to each other as are the ledge 70 and central portion 72, while the inner surfaces of the chock are at the same angle to each other as the bearing surface 51 and under surface of the projection 50. Thus, the chock can be received snugly on the ledge of the segment or can snugly receive the projection 50. Each chock is of limited width (FIG. 4), such width being preferably approximately the width of the central portion 72 of the segment 62 in the embodiment of FIG. 4. In a preferred embodiment, this width is one-fourth inch. In the embodiment of FIG. 2, the second leg 86 of the chock is of such a length that its end wall 87 abuts the side wall 44 of the valve body groove 38 so as to prevent premature tipping of the chock and, consequently, of the segment by forces which tend to move the ring 52 out of the groove.

In the assembly of the butterfly valve 10, as illustrated in FIGS. 1–5, assuming all initial machining has been accomplished, the valve seat 52 is inserted into the groove, 38 in abutting relation to the wall 46 of the groove and segments 62 are then placed in the groove in end-to-end relation until they define a segmented ring. At this stage of assembly, an annular gap will exist intermediate the segments 62 and the opposite wall 44 of the groove, and the ring 52 will not be in axial compression. A chock 64 is then placed intermediate the segment 62 and the projection 50 in the vicinity of the end surface 82 of the segment, there being a loose fit between the segment and projection at this point, because of the distance between the end surface 82 and the projection relative to the size of the segment. A suitable tool such as a screwdriver is then inserted between the projection 50 and the segment in the vicinity of the central portion 72 to wedge the segment toward the valve seat ring 52, thereby enlarging the gap between the segment and the wall 44 and placing the ring 52 in compression. While the gap is so enlarged, the chock is moved along the segment until it is properly disposed relative to the central portion 72. In the embodiment of FIG. 4, this is accomplished by moving the chock past the inclined flanking surfaces 80 and 78 until it is positioned generally centrally of the central portion 72. In the embodiment of FIG. 5, this is accomplished by moving the chock directly from the surface 80 to the surface 72 until it is positioned adjacent a rib 83. It will be noted that in the embodiment of FIG. 5, two chocks are employed, one adjacent each rib 83.

The foregoing operation is repeated for each segment until a chock is positioned intermediate each central portion 72 and the adjacent bearing surface 51 of the projection 50.

The proper or desirable degree of compression of the valve seat ring 52 may be determined empirically by connecting the valve inlet to a source of fluid under pressure with the valve disc 28 in the closed position and then checking the outlet side of the valve disc for leakage. When points of leakage are noted, shims 66 are placed either as shown in FIG. 2 or as shown in FIG. 3 until the leakage is abated.

When the embodiment of FIG. 2 is employed, it is preferable that the central portion 72 of each segment be provided with a dimple 88 and that each shim 66 be similarly dimpled, as at 90, the dimples being mutually alignable so that the shims are restrained from shifting movement relative to one another and to the segment 62 when properly located. The chock 64 may also be provided with an outwardly projecting teat to fit into the dimples 90 of the shims. Alternatively, when the embodiment of FIG. 3 is employed, i.e., when the chock 64 is nested on the ledge 70 of the segment 62, it is desirable to provide an indentation or dimple as at 92 in that face of the chock adjacent the bearing surface 51 of the projection 50 and, again, to provide dimples 90 in the shims, thereby assuring a proper location of the shims relative to the chock. In the embodiment of FIG. 3, the position of each chock relative to its adjacent segments may also be maintained by providing a notch 94 in the top wall of the segment 62 and by "prick punching" the edge of the chock adjacent the notch to offset a small portion 96 of the edge of the chock outwardly into the notch 94 to restrain the chock from lateral shifting movement relative to the segment.

With the construction thus provided, a plurality of segments defining a back-up ring for the resilient ring of the valve seat can be properly positioned so as to maintain the resilient ring in a proper degree of compression and prevent leakage between the valve seat and ring.

While certain specific embodiments of the invention have been shown and described, it should be apparent that various modifications may be made therein without departing from the scope of the invention.

Various of the features of the invention are set forth in the following claims.

What is claimed is:

1. A butterfly valve comprising
    A. a valve body having a fluid flow passageway provided with an inner annular groove defined by a base encircling said passageway and opposed groove walls extending from said base in the direction of the flow axis of said passageway,
       1. one of said groove walls being provided with a projection overhanging said groove base and extending in the direction of the other of said groove walls,
          a. said projection defining an inclined bearing surface facing in the direction of said groove base,
    B. a ring defining a valve disc seat disposed in said annular groove and projecting radially into said fluid flow passageway with one surface of said ring in engagement with one of said opposed groove walls,
       1. said ring being formed of a resilient material capable of expanding radially when subjected to forces having components extending in a direction parallel to the flow axis of said passageway,
       2. said ring being proportioned so as to provide an annular space intermediate a portion of said ring and the other of said opposed groove walls,
    C. a plurality of segments disposed essentially end-to-end in said annular space for axially shifting movement,
       1. one wall of each of said segments being contoured to conform to that face of said ring opposite said one face, 2. the opposite wall of each of said segments being spaced from said valve body projection and defining a ledge and a face extending from said ledge toward the flow axis of said valve body passageway,
   a. each of said segment faces including a central portion disposed generally parallel to said bearing surface of said projection and a flanking surface having one end adjacent at least one lateral edge of said central portion,
      1. the distance between the end of said flanking surface opposite said one end and said bearing surface of said projection being significantly greater than the distance between said central portion and said bearing surface of said projection,
D. a chock for each of said segments having a length measured circumferentially of said valve body appreciably less than its respective segment and being adapted to be moved along said segment from a position between said flanking surface and said bearing surface of said projection to a position between said central portion of said segment and the adjacent portion of the bearing surface of said projection,
   1. said chock including a first surface adapted to be positioned adjacent and generally parallel to said central portion of said segment, a second surface adapted to be positioned adjacent and generally parallel to said bearing surface of said projection, and a portion adapted to be positioned in underlying relation to the surface of said projection overhanging said groove base and in engagement with said overhanging surface,
      a. said underlying portion being dimensioned so as to enable it to be easily inserted beneath said projection when said chock is positioned adjacent said end of said flanking surface opposite said one end,
E. and shims disposed in contact with one of said first and second surfaces of said chock,
   1. the distance between the first and second surfaces of said chock and the thickness of said shims being determinative of the distance between the central portion of said segment and said bearing surface of said projection and being determinative of the degree of compression of said ring.

2. A butterfly valve in accordance with claim 1, wherein said segments from essentially a continuous ring in said annular space intermediate said seat defining ring and said other of said opposed groove walls.

3. A butterfly valve in accordance with claim 1, wherein a diverging flanking surface is provided adjacent each of the lateral edges of said central portion.

4. A butterfly valve in accordance with claim 1, wherein said shims are disposed intermediate said central portion of each of said segments and said first surface of said chock, and wherein said second surface of said chock engages said bearing surface of said projection.

5. A butterfly valve in accordance with claim 4, wherein one of said central portion of said segment and said first surface of said chock is provided with an indentation, and wherein each of said shims is indented to provide a dimple adapted to be received into said first mentioned indentation and into the indentations of said other shims to locate each of said shims in a predetermined position.

6. A butterfly valve in accordance with claim 1, wherein said shims are disposed intermediate said bearing surface of said projection and said second surface of said chock, and wherein said first surface of said chock is in engagement with said central portion of said segment.

7. A butterfly valve in accordance with claim 6, wherein said second surface of said chock is provided with an indentation, and wherein each of said shims is indented to provide a dimple adapted to be received into said indentation of said chock and into the indentations of said other shims to locate said shims relative to said chock.

8. A butterfly valve in accordance with claim 6, wherein a groove is provided on said segment to receive an offset portion of said chock to locate said chock relative to said segment.

9. A butterfly valve in accordance with claim 1, wherein a pair of said chocks is provided for each of said segments, said chocks are positioned adjacent each of opposite ends of said central portion of said segment and in engagement therewith, and wherein means are provided to locate said chock relative to said central portion of said segment.

10. A butterfly valve in accordance with claim 1, wherein said portion of said chock underlying said projection includes a surface in abutting engagement with said one of said groove walls underlying said projection so as to resist tipping of said chock.

* * * * *